July 6, 1943.   A. F. GORDY ET AL   2,323,654
CLAMPING TOOL
Filed Dec. 26, 1940
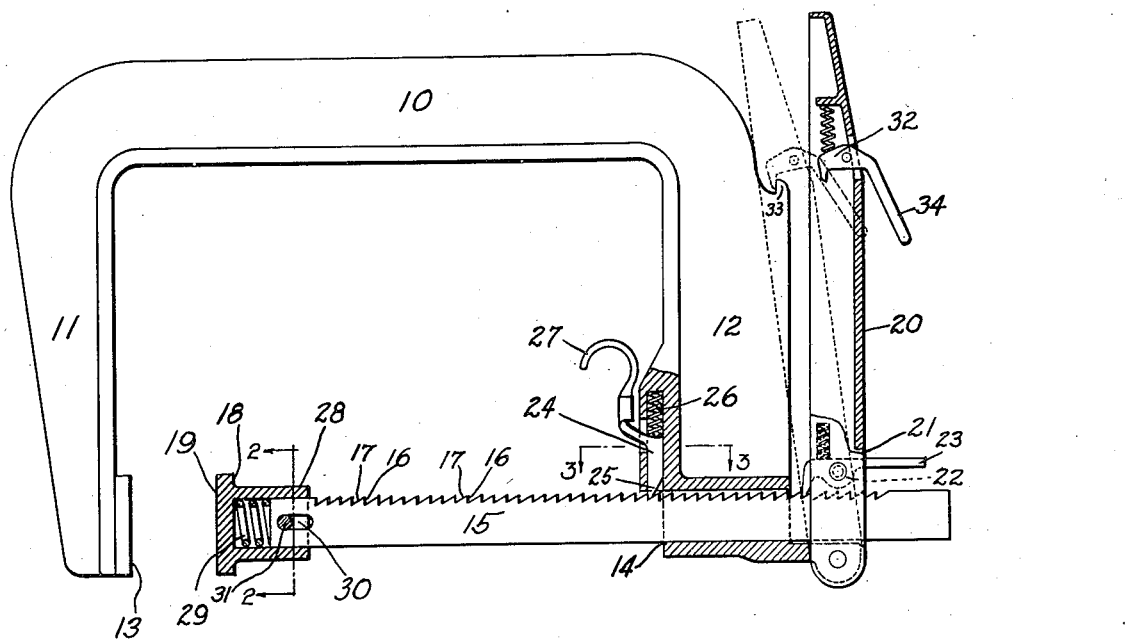
Fig-1-
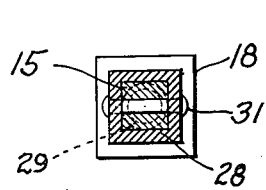
Fig-2-
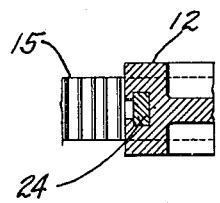
Fig-3-
ALBERT FRANK GORDY
ALFRED F. RADE
                INVENTORS.
BY John E. Eastlack
    ATTORNEY.

Patented July 6, 1943

2,323,654

UNITED STATES PATENT OFFICE 2,323,654

CLAMPING TOOL

Albert Frank Gordy, Los Angeles, and Alfred F. Rade, Wilmar, Calif., assignors of thirty-one and two-thirds per cent to Albert M. Rex, South Gate, Calif.

Application December 26, 1940, Serial No. 371,812

2 Claims. (Cl. 144—305)

This invention relates to improvements in clamping tools, and has for its principal object the provision of a tool by which clamping operations may be performed with much greater efficiency and rapidity than with tools heretofore used for the same purpose.

Another important object of the invention is to provide an efficient clamping tool embodying a novel construction having positive and speedy action, simply constructed and inexpensive of manufacture, and not likely to get out of order.

A further important object of the invention is to provide a clamping device which shall ever grip the work in a direct line between its clamping jaws, providing a maximum amount of clamping pressure with a minimum of manual effort, and be entirely free from the very objectionable action known as "walking" or traveling of its retractable jaw over the surface of the work at the time final pressure is exerted to clamp the tool in fixed position against the work.

A still further object of the invention is to provide an efficient screwless speed-clamp or vise which can be readily adjusted in work-gripping position, positively aligning, and capable of securely gripping an object without the exertion of extreme pressure upon its jaws.

Another object of the invention is to provide a screwless clamp or vise of the rack and pawl type, in which the gripping action will be positive even though extreme pressure is not applied, and in which device the teeth of the rack need not be closely spaced in order to effect the desired clamping pressure, regardless of the class of work to which it may be applied.

Other objects of the invention will become apparent from the disclosures in the accompanying drawing and following specification.

The invention, in a preferred form, is illustrated in the drawing and hereinafter more fully described.

In the drawing:

Figure 1 is a side elevation, partly in section, showing the new clamping device of our invention.

Figure 2 is a sectional view taken on the line 2—2 of Figure 1.

Figure 3 is a somewhat enlarged sectional view taken on the line 3—3 of Figure 1.

As shown in the drawing:

The reference numeral 10 indicates generally the body or frame of a clamp made in the form of a C and having oppositely disposed arms 11 and 12. The arm 11 is made in the form of a stationary gripping jaw having an inwardly directed, relatively wide and flat face 13.

The terminus of the arm 12 is hollow, forming a squared opening or sleeve 14, in which is slidably mounted a toothed bar or rack 15, the teeth of which face inwardly and extend over the major portion of the longitudinal surface of the bar. These teeth are preferably angularly directed toward the arm 12, so that notches are formed having stop faces 16 at substantially right angles to the bar 15, and inclined riding surfaces 17 over which stop members may readily travel by cam action.

Upon the inner terminus of the bar 15 is securely mounted a somewhat enlarged gripping member or head 18 having a gripping face 19 similar to the face 13. The member 18 together with its associated rack bar 15 forms the movable jaw of the device.

A pressure lever 20 is mounted exteriorly adjacent the arm 12, and is pivoted at the extreme terminus of the arm 12 beyond the sleeve 14. This lever 20 is preferably hollow and U-shaped in cross-section to provide light weight and simple construction, as well as for the purpose of providing for convenient mounting of its associated parts as hereinafter described. A squared opening 21 is cut through the lever 20 adjacent its pivoted end and this opening is in registration with the opening 14 so as to slidably receive the bar 15 and allow the latter to extend therethrough when in retracted position. A spring-impelled pawl 22 is pivotally mounted in the lever 20 adjacent the opening 21 and is normally held in position against the toothed bar 15. The pawl 22 is readily releasable from engagement with the adjacent teeth by means of slight pressure applied against its elongated extension 23, which projects outward through the opening 21 and is within convenient reach of the operator's finger.

A stop pin or dog 24 is slidably mounted along the inner side of the arm 12 and its inclined terminus 25 is normally held in engagement with the toothed face of the bar 15 by a spring 26 so as to prevent the bar 15 from moving in a direction away from the arm 11. The pin 24 has an integral trigger shaped extension 27 by which the same may be conveniently released and held out of engagement with the bar against the tension of the spring 26, by the operator's finger.

Obviously pressing of the lever 20 in the direction of the arm 12 while the pawl 22 is in engagement with the bar 15 will cause the bar 15 to move through the openings 21 and 14 and move the head 18 toward work-gripping position opposite the face 13, the inclined head 25 of the pin 24 passing successively over the adjacent teeth of the bar 15 and finally coming to rest in one of the depressions thereof when manipulation of the lever is discontinued, thus holding the jaws firmly in set position while the lever 20 may be returned to its original position for application of further pressure should such be necessary, in which event the pawl 22 rides back over the inclined surfaces 17 in an obvious manner in the return direction.

It will be apparent that if the pawl 22 and the stop pin 24 are released simultaneously the bar 15 is free to move in either direction through the sleeve 14 and the lever opening 21, and thus it is possible for the operator to quickly bring the jaws of the clamp into fully extended position or into any desired gripping position by allowing the bar 15 to drop into either position by gravity, or otherwise cause the desired movement of the same by simple manipulation of the freely sliding bar.

In ordinary use, the work is simply placed between the open jaws while the pawl 22 and the pin 24 are held in released position, whereupon the bar 15 is slid into gripping relationship against the work and the pawl and pin members allowed to snap into the teeth of the bar as soon as contact is made between the jaws and the work. From this point pressure is applied upon the lever 20 to bring about the final tightening, which can usually be accomplished by depressing the lever 20 but a fraction of its full path of travel.

In order to provide for instant gripping contact and for other purposes to be later described, we prefer forming the head 18 with a hollow extension 28 as best shown in Figures 1 and 2, and mounting the same over the terminus of the bar 15 against the spreading action of a strong coil spring or the like 29 which is positioned interiorly of the hollow extension 28 and constantly exerts tension against the head 18 and the bar 15. A longitudinal slot 30 of restricted length is formed through the bar 15 as best shown in Figure 1, and the head 18 is secured to the bar by passing a pin or rivet 31 through suitable openings in the extension 28 and through the slot 30. The slot 30 allows of restricted longitudinal movement of the head 18 over the terminus of the bar 15, so that original pressure upon the work in a clamping operation is by means of the cushioned head 18 and not direct by the unyielding bar 15, and it has been found in practice that by the use of a fairly strong coil spring the desired degree of tightening can usually be effected without causing the spring to become fully compressed. Thus when the faces 13 and 19 are brought into contact with the work and pressure is applied upon the lever 20 a secure grip will instantly result which will hold the work securely in position until maximum tightening pressure is applied so as to make the work ready for the operation to be performed. When the material to be worked on is of a fragile nature this "floating" or yieldable type of head is highly effective in preventing marring of the surfaces or otherwise injuring the work which often occurs when the clamping pressure is directly exerted by a rigid, unyielding bar or screw, and in our own use of this device it has seldom been found necessary to apply extreme pressure to accomplish the desired gripping of most materials, including hard, heavy metal objects.

As best shown in Figure 2, the extension 28 of the head 18 as well as the bar 15 are preferably square in cross-section and snug fitting, so that the head 18 cannot revolve upon the bar. Since the bar 15 is perfectly straight and non-rotatable, no "walking" or traveling of the head 18 over the work can occur when final tightening pressure is applied, and the accurately aligned members 13, 18, and 15 make for straight and direct clamping of the work at all times, resulting in an ideal condition never heretofore attained, as clamps previously used, in addition to the common fault of marring and defacing surfaces by direct pressure and by "walking," have often by failure of the jaws to remain in alignment injured the tool by bending the same out of shape, or even destroyed the same by snapping of some part of the tool structure.

To guard against accidental dislodgement of the clamped work from the device under certain adverse conditions, such as when severe blows are struck against the clamped material during manufacturing operations, or perhaps due to breakage of the spring 26, which might tend to release the pin 24 from engagement with the toothed surface of the bar 15, our device further provides a means by which the lever 20 may be securely anchored to the frame 10 after the desired degree of clamping has been accomplished. While this can be accomplished by a variety of methods known to those mechanically inclined, we prefer to use the method best illustrated in Figure 1, wherein the handle end of the hollow lever 20 has pivoted therein a spring-impelled pawl or hook 32 which is adapted to engage a co-operating hook element 33 formed integral with the frame 10 in the manner shown by the dotted lines in Figure 1, the pawl 32 being readily releasable by pressing its elongated extension 34 after exerting slight pressure upon the lever 20, in an obvious manner.

By the use of this safety anchoring feature it is also possible to accomplish a more minute degree of secured clamping pressure than the spacing of the teeth of the bar 15 normally allows. For example, when it is found upon exerting the desired clamping pressure upon the lever 20 that the pin 24 is riding over a tooth midway between two stop faces, engagement of the pawl 32 with the hook 33 will hold the depressed lever 20 securely in position, and the burden normally borne by the pin 24 will then be transferred to the engaged pawl 22, which, in turn, is kept in position by the safety catch 33—32, while pressure is further stabilized by the self-adjusting, yieldable structure of the head 18.

It will be seen that herein is provided a tool which is applicable to use in many important present-day industries, particularly such as are concerned with production of armaments, aircraft, and other devices under the current national defense program, wherein production speed is an immediate goal. The device of our invention is designed to render a valuable service to these industries in that by its use operations can be greatly speeded up and the work involved performed with greater efficiency and accuracy.

We are aware that many changes may be made and numerous details of construction varied throughout a wide range without departing from the principles of our invention, and the foregoing disclosure is intended to illustrate merely one form in which the invention may be carried out. Our experiments included the use of clamps of this type equipped with compound or multiple-leverage handles as well as with the simple form herein shown. Results indicated that the use of the simple, direct-pressure lever is fully adequate to provide any desired pressure regardless of the size of clamp used or the nature of the work, and its action is just as easy, smooth, and positive, the design of the apparatus having eliminated the usual strain.

We claim as our invention:

1. A quick acting clamp comprising a C-frame including an arm providing a stationary jaw and a second arm formed with an opening opposite said jaw, a toothed bar slidably and non-rotatably extending through said opening and having a jaw member yieldingly mounted on the inner end thereof in opposing relation to the stationary jaw whereby work may be yieldingly gripped between the jaws by sliding said toothed bar inwardly, a spring pressed latching pawl carried by said second arm for engagement with the teeth of said bar to normally prevent retraction of the bar, and a lever having one end pivotally connected with said second arm and further having a spring pressed operating pawl for engagement with the teeth of said bar for substantially instantaneous tightening of the clamped jaws against the work when the lever is swung toward the frame.

2. A quick acting clamp comprising a C-frame including an arm providing a stationary jaw and a second arm formed with an opening opposite said jaw, a toothed bar slidably and non-rotatably extending through said opening and having a jaw member yieldingly mounted on the inner end thereof in opposing relation to the stationary jaw whereby work may be yieldingly gripped between the jaws by sliding said toothed bar inwardly, a spring pressed latching pawl carried by said second arm for engagement with the teeth of said bar to normally prevent retraction of the bar, a lever having one end pivotally connected with said second arm and further having a spring pressed operating pawl for engagement with the teeth of said bar for substantially instantaneous tightening of the clamping jaws against the work when the lever is swung toward the frame, and coacting latch means on the lever and frame operative at the end of the swinging movement of the lever for cooperation with said latching pawl to provide for a finer degree of pressure adjustment when the bar is latched.

ALBERT FRANK GORDY.
ALFRED F. RADE.